US006909601B2

(12) United States Patent
Hsieh

(10) Patent No.: US 6,909,601 B2
(45) Date of Patent: Jun. 21, 2005

(54) PERIPHERAL CONNECTING DEVICE FOR AN ELECTRONIC DEVICE

(75) Inventor: Hsin-Che Hsieh, Taoyuan (TW)

(73) Assignee: Benq Corporation, Taoyuan (TW)

(*) Notice: Subject to any disclaimer, the term of this patent is extended or adjusted under 35 U.S.C. 154(b) by 0 days.

(21) Appl. No.: 10/322,234

(22) Filed: Dec. 17, 2002

(65) Prior Publication Data

US 2003/0119367 A1 Jun. 26, 2003

(30) Foreign Application Priority Data

Dec. 25, 2001 (TW) ........................................ 90132238 A

(51) Int. Cl.[7] ........................................ G06F 1/16

(52) U.S. Cl. ........................ 361/686; 710/304; D14/434; 439/638

(58) Field of Search .................. 439/638; 361/683–686; 710/303, 304; D14/30–434

(56) References Cited

U.S. PATENT DOCUMENTS 5,199,888 A * 4/1993 Condra et al. .............. 439/142
5,436,792 A * 7/1995 Leman et al. ............... 361/686
6,256,193 B1 * 7/2001 Janik et al. ................. 361/683
6,628,517 B1 * 9/2003 Helot et al. ................. 361/686
2003/0162445 A1 * 8/2003 Fujita et al. ................ 439/638

* cited by examiner

*Primary Examiner*—Lisa Lea-Edmonds
(74) *Attorney, Agent, or Firm*—Ladas & Parry LLP

(57) ABSTRACT

A peripheral connecting device of an electronic device. The peripheral connecting device includes a control device, a host connecting device and a plurality of peripheral connectors, including a display connector connected between a display device and the control device and a input device connector connected between a input device and the control device. The peripheral connecting device connects the input device and the display device with the electronic device to transmit information. The peripheral connecting device further performs network connection. With the peripheral connecting device, users can access a network. The peripheral connecting device is connected to a host through the network. The host performs the authentication of the electronic device.

14 Claims, 5 Drawing Sheets

PERIPHERAL CONNECTING DEVICE FOR AN ELECTRONIC DEVICE

BACKGROUND OF THE INVENTION

1. Field of the Invention

The present invention relates in general to a peripheral connecting device for an electronic device. In particular, the present invention relates to a peripheral connecting device for all kinds of peripheral devices to connect with a portable electronic device.

2. Description of the Related Art

Portable electronic devices may have many functions, such as a telephone directory, schedule reminder, notebook, calculator, world time, balance sheet and so on. Portable electronic devices also provide information transmission services, such as network connection and email, and network management, such as system setting and information security. It is convenient to carry a portable electronic device which has small volume and light weight. For those reasons, people like using portable electronic devices. However, in the office, because the screen of the typical portable electronic device is small, using the portable electronic device for word processing or editing software is not as convenient as using a desktop computer.

To solve these problems of portable electronic devices such as a Personal Digital Assistant, FIG. 1 shows the peripheral connection configuration of a conventional Personal Digital Assistant. The Personal Digital Assistant 2 is connected to a portable keyboard 4. A user can input information to the Personal Digital Assistant 2 for word processing by using the keyboard. Then, the information input by the user is displayed on the screen of the Personal Digital Assistant 2. The screen of the Personal Digital Assistant 2 is smaller than that of a desktop computer. The small screen is impractical for the user, especially if large amounts of information are displayed.

SUMMARY OF THE INVENTION

Accordingly, the object of the present invention is to provide a peripheral connecting device of an electronic device, such as a portable Personal Digital Assistant, which peripheral connecting device can connect with many kinds of peripheral devices. The peripheral connecting device and the electronic device are separate. The peripheral connecting device connects the electronic device to peripheral devices, such as a monitor. Therefore, in the office, the electronic device, which may be regarded as a host, has many functions and the advantage to connect and disconnect easily without the trouble of the wiring connection. Because the electronic device maintains its portability, the user can take the electronic device when he or she leaves the office. Furthermore, the peripheral connecting device can also connect the electronic device with a host through a network. The host is used for the authentication of the electronic device. By this, only users who have been authorized can access the network and it becomes easier for a network manager to manage the network. And the user can share resources which connected to the network. Functions of the electronic device can be expanded as the network expanded.

To the above purpose, the present invention provides a peripheral connecting device of an electronic device that comprises a control device, a host connecting device and a plurality of peripheral connectors including an input device connector, a display connector and a network connector. Through the peripheral connecting device, the electronic device is connected to a display device and an input device to exchange information. As well, the input device can be a keyboard where the peripheral connecting device is built into.

In one embodiment, the peripheral connecting device is separate from the electronic device (such as a Personal Digital Assistant) and selectively connected to the electronic device. The peripheral connecting device comprises (a) a host connecting port, (b) an input device connector, (c) a display connector, (d) a network connector and (e) a video transforming circuit. The host connecting port includes (a1) a video signal connector, (a2) a network signal connector and (a3) an input signal connector. The host connecting port is connected to the electronic device. The video signal connector transmits a first video signal between the peripheral connecting device and the electronic device. The input signal connector transmits an input signal between the peripheral connecting device and the electronic device. The network signal connector transmits the network signal between the peripheral connecting device and the electronic device. The input device connector is connected with an input device to transmit the input signal between the input device and the peripheral connecting device. The display connector is connected with a display device to transmit the input signal between the display device and the peripheral connecting device. The network connector is connected with an exterior network to transmit a network signal between the exterior network and the peripheral connecting device. The video transforming circuit is connected between the host connecting port and the display connector to transform the first video signal to a second video signal and transmit the second image signal to the display connector.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The invention provides a peripheral connecting device which connects an electronic device, such as a Personal Digital Assistant, with different kinds of peripheral devices. The peripheral connecting device is separate from the electronic device, such as Personal Digital Assistant, and can be connected to the electronic device.

Figure 1:
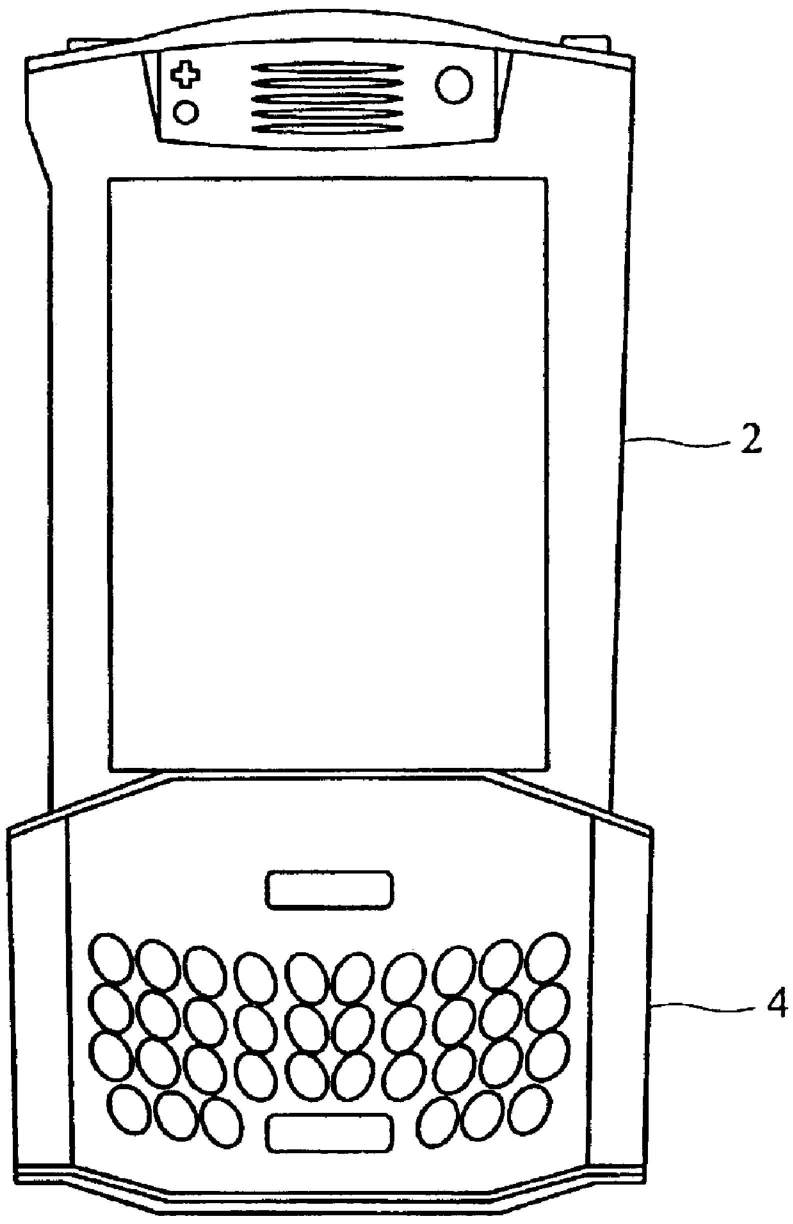
FIG. 1 ( PRIOR ART )
FIG. 1 is a diagram illustrating the peripheral connection configuration of a conventional Personal Digital Assistant.
Figure 2A:
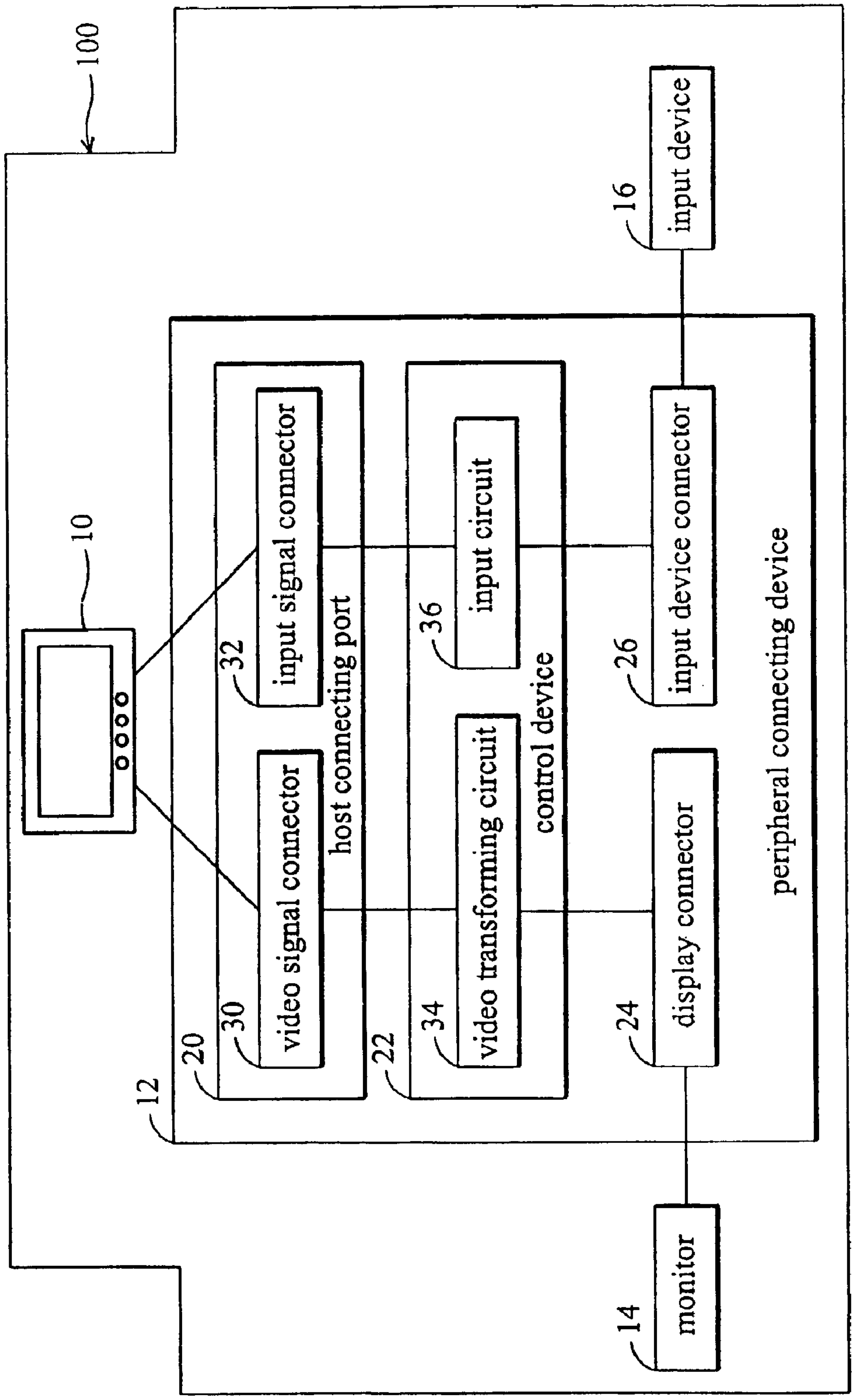
FIG. 2*a* is a diagram illustrating the peripheral connecting device of the electronic device in the first embodiment of the present invention.

FIG. 2*a* shows the peripheral connecting device of the electronic device in the first embodiment of the present invention. The peripheral connection system 100 comprises a Personal Digital Assistant 10, a peripheral connecting device 12, a monitor 14 and an input device 16 (such as a keyboard, mouse or other input device). The peripheral connecting device 12 comprises a host connecting port 20, a control device 22, a display connector 24 and an input device connector 26. The host connecting port 20 comprises a video signal connector 30 and an input signal connector 32. The control device 22 comprises a video transforming circuit 34 and an input circuit 36. The host connecting port 20 connects the Personal Digital Assistant 10 with the control device 22. The monitor 14 is connected to the display connector 24. The display connector 24 is a standard display connector such as VGA interface. The input device connector 26 connects the input device 16 with the input circuit 36. The video signal in the Personal Digital Assistant 10 is connected with the video transforming circuit 34 by the video signal connector 30. The video signal outputted from Personal Digital Assistant 10 is transformed into a video signal which suited to the monitor 14 by the video transforming circuit 34. For example, the resolution of the video signal outputted from Personal Digital Assistant 10 is 320×240. The video transforming circuit 34 transform the signal's resolution to 800×600 or 1024×760 which suited for to the monitor 14. The display connector 24 connects the video transforming circuit 34 with the monitor 14. The input device connector 26 connects the input device 16 with the input circuit 36. The input circuit 36 is connected to the Personal Digital Assistant 10 by the input signal connector 32.

The information is transferred from the input device 16 to the input circuit 36 of the control device 22. The input signal connector 32 receives the information through the input circuit 36 and outputs it to the Personal Digital Assistant 10. Thus, the input device 16 is regarded as an input device of the Personal Digital Assistant 10. The input device may be a keyboard, a mouse or other equipment for input signal.

Figure 2B:
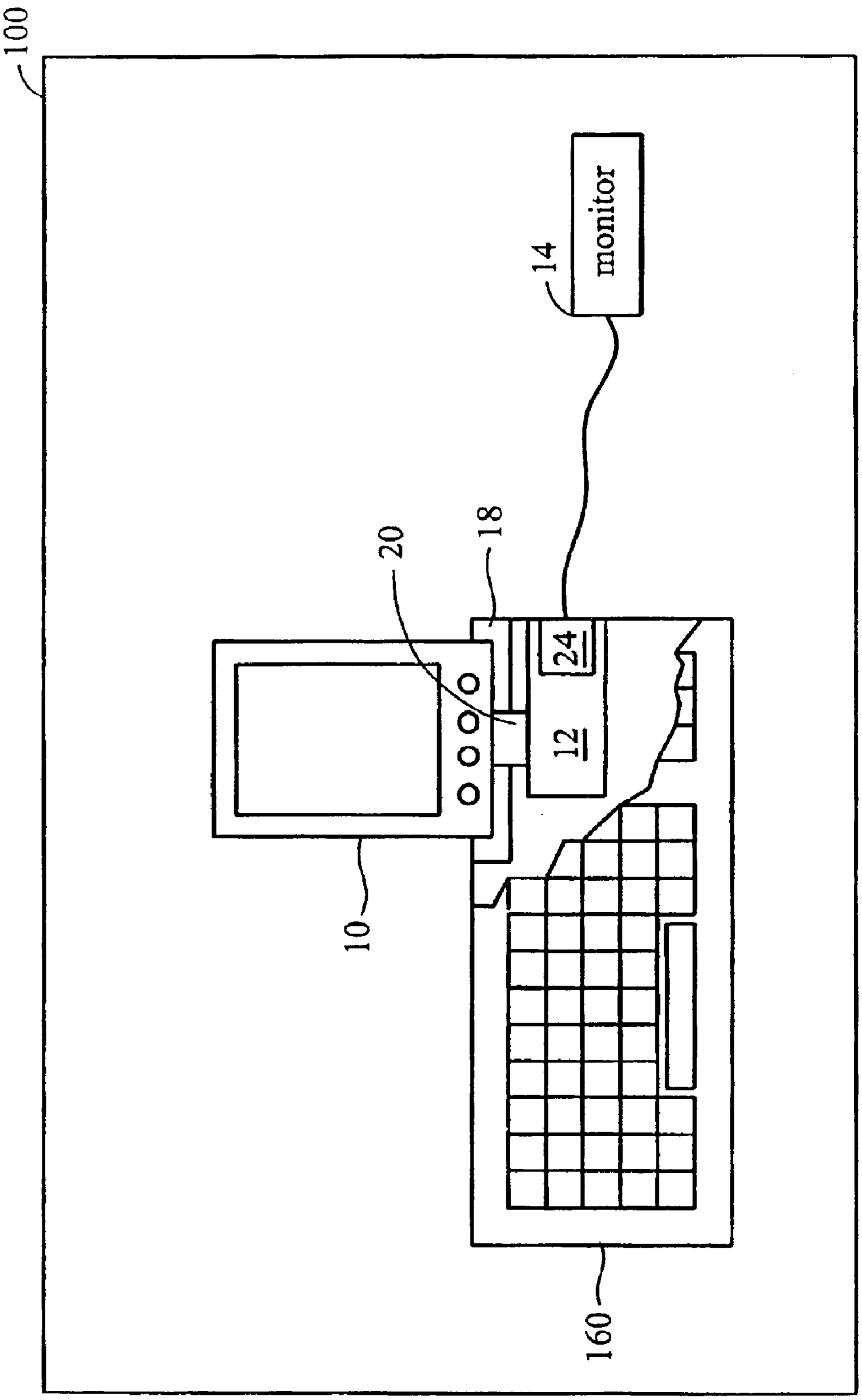
FIG. 2*b* is a diagram illustrating another configuration of the peripheral connecting device of the electronic device in the first embodiment of the present invention.

FIG. 2*b* is a diagram illustrating another configuration of the peripheral connecting device of the electronic device in the first embodiment of the present invention. FIG. 2*b* is basically the same as FIG. 2*a*, with the difference that the input device in FIG. 2*b* is a keyboard 160 and the peripheral connecting device 12 is built into the keyboard 160. The Personal Digital Assistant 10 is placed in a Personal Digital Assistant slot 18 and connected to the host connecting port 20 of the peripheral connecting device 12. The monitor 14 is also connected to the display connector 24 of the peripheral connecting device 12. Because the input device in the embodiment is the keyboard 160 and the peripheral connecting device 12 is built into the keyboard 160, the other difference between FIG. 2*a* and FIG. 2*b* is that the input device connector 26 in FIG. 2*a* is omitted in FIG. 2*b*.

Figure 3A:
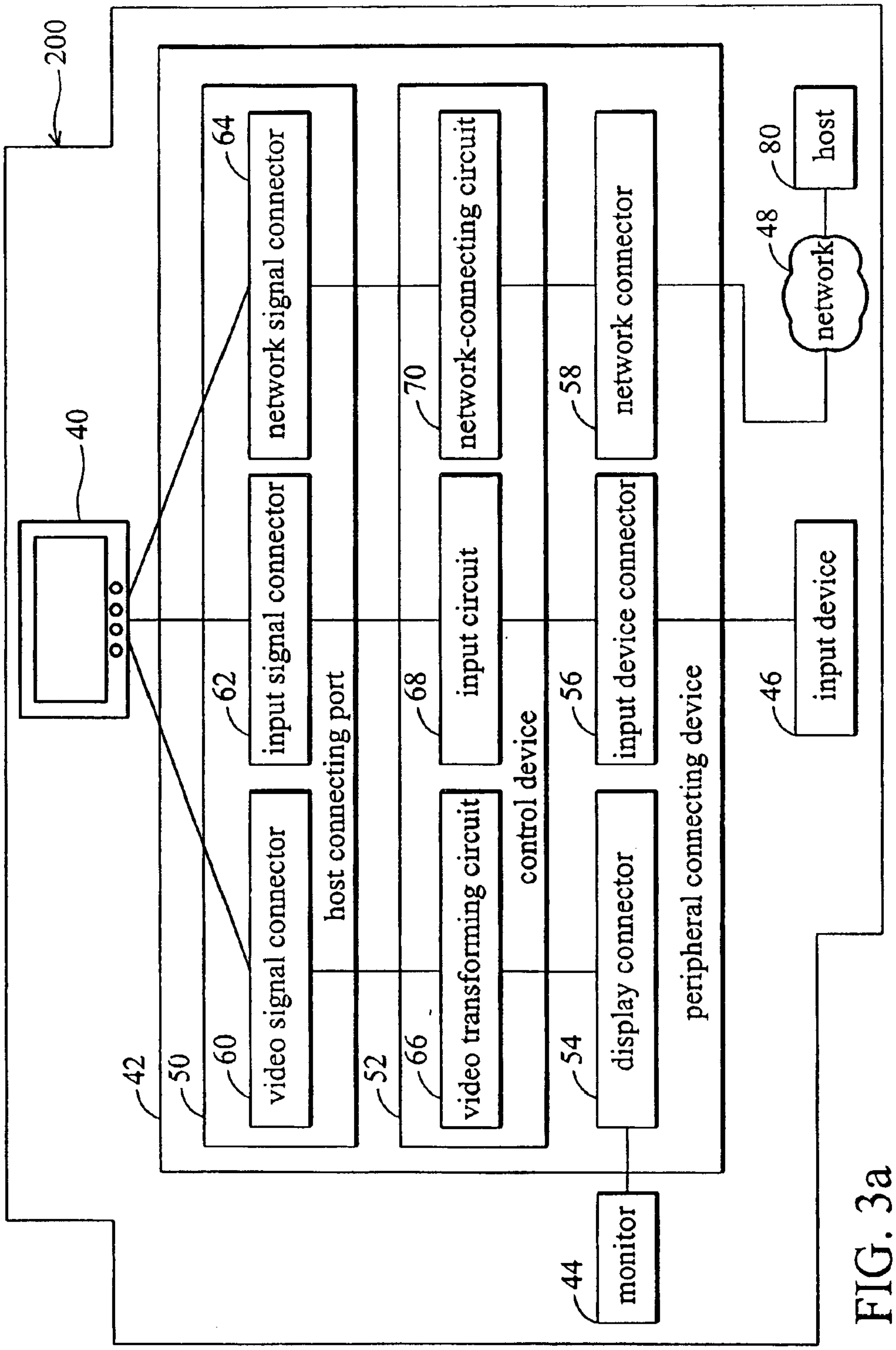
FIG. 3*a* is a diagram illustrating the peripheral connecting device of the electronic device in the second embodiment of the present invention.

FIG. 3*a* shows the peripheral connecting device of the electronic device in the second embodiment of the present invention. The peripheral connection system 200 comprises a Personal Digital Assistant 40, a peripheral connecting device 42, a monitor 44, an input device 46 and a network 48. The peripheral connecting device 42 comprises a host connecting port 50, a control device 52, a display connector 54, an input device connector 56 and a network connector 58. The host connecting port 50 comprises a video signal connector 60, an input signal connector 62 and a network signal connector 64. The control device 52 comprises a video transforming circuit 66, an input circuit 68 and a network-connecting circuit 70. The display connector 54, input device connector 56 and network connector 58 are used for the external connection of the peripheral connecting device 42. The host connecting port 50 connects the Personal Digital Assistant 40 with the control device 52. The monitor 44 is connected to the display connector 54. The display connector 54 is a standard display connector such as a VGA interface. The input device connector 56 connects the input device 46 with the input circuit 68. The video signal in the Personal Digital Assistant 40 is connected to the video transforming circuit 66 by the video signal connector 60. The video signal is transformed to a video signal suited to the monitor 44 by the video transforming circuit 66. The display Connector 54 connects the video transforming circuit 66 with the monitor 44. The input device connector 56 connects the input device 46 with the input circuit 68. The input circuit 68 is connected to the Personal Digital Assistant 40 by the input signal connector 62. The network-connecting circuit 70 connects the network signal connector 64 with the network connector 58. The network connector 58 is connected to the network 48.

The information is transferred from the input device 46 to the input circuit 68 of the control device 52. The input signal connector 62 receives the information through the input circuit 68 and outputs it to the Personal Digital Assistant 40.

The peripheral connection system 200 in the embodiment of the present invention further comprises a host 80 connected to the network 48. The Personal Digital Assistant 40 can access the network 48 by the peripheral connecting device 42. The host 80 is used for the authentication of the electronic device 40. Only the users who have the authorization can use the Personal Digital Assistant 40.

Figure 3B:
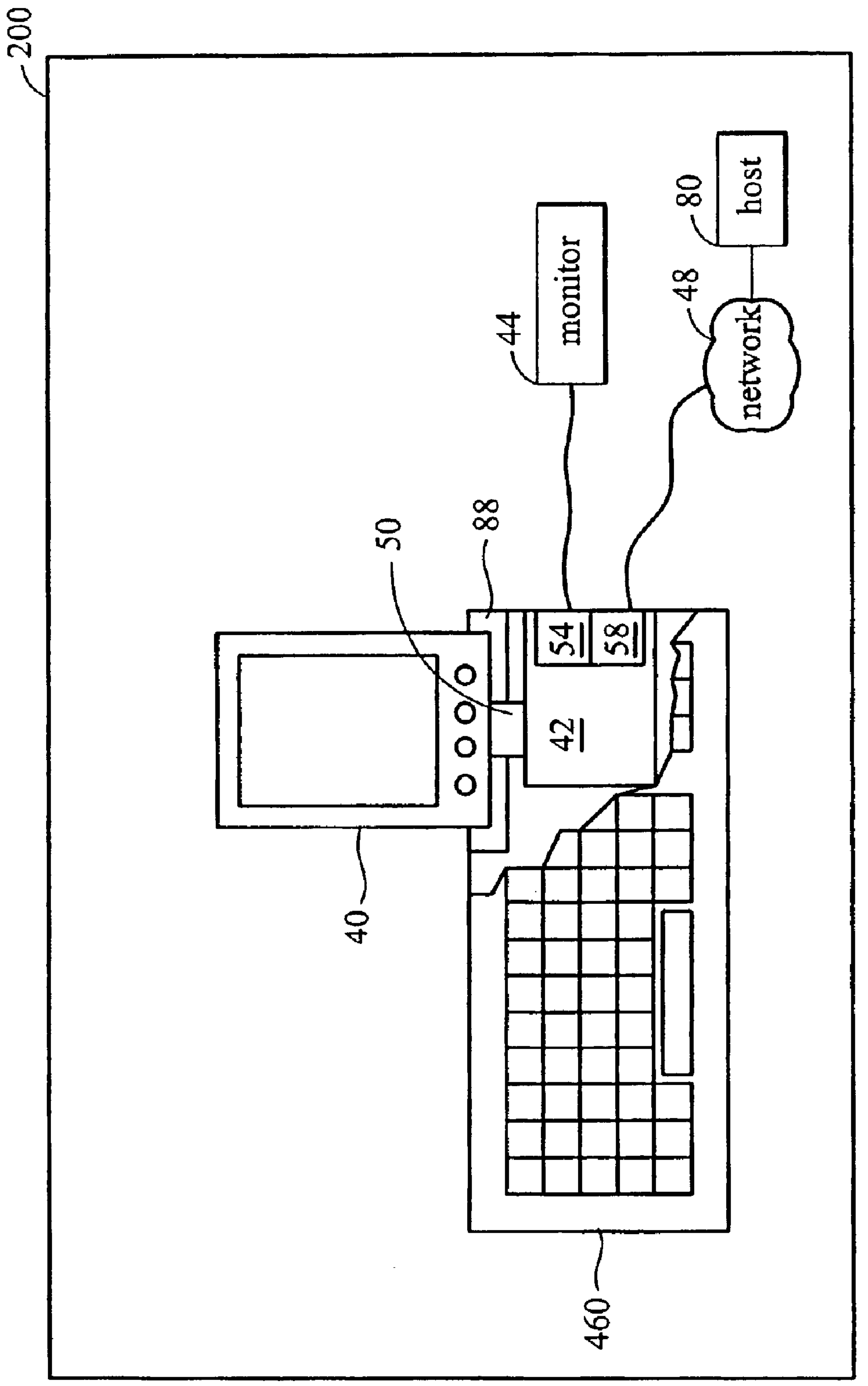
FIG. 3*b* is a diagram illustrating another configuration of the peripheral connecting device of the electronic device in the second embodiment of the present invention.

FIG. 3*b* is a diagram illustrating another configuration of the peripheral connecting device of the electronic device in the second embodiment of the present invention. FIG. 3*b* is basically the same as FIG. 3*a*, with the difference that the input device in FIG. 3*b* is a keyboard 460 and the peripheral connecting device 42 is built into the keyboard 460. The Personal Digital Assistant 40 is placed in a Personal Digital Assistant slot 88 and is connected to the host connecting port 50 of the peripheral connecting device 42. The monitor 44 is also connected to the display connector 58 of the peripheral connecting device 42. Because the input device in the embodiment is the keyboard 460 and the peripheral connecting device 42 is built into the keyboard 460, the other difference between FIG. 3*a* and FIG. 3*b* is that the input device connector 56 in FIG. 3*a* is omitted in FIG. 3*b*.

As described above, the peripheral connecting device of the electronic device of the present invention provides connection between the peripheral connecting device and all kinds of peripheral devices. In the office, the electronic device, which may be regarded as a host, has many functions and the advantage to connect and disconnect easily without the trouble of the wiring connection. Because the electronic device still keep its portability, the user needs only take the electronic device when leaving the office.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A peripheral connecting device of an electronic device, comprising:

a host connecting port connected to the electronic device, the host connecting port comprising a video signal connector for receiving a first video signal from the electronic device, and an input signal connector for transmitting an input signal to the electronic device;

an input device connector connected with an input device to transmit the input signal from the input device to the input signal connector;

a display connector connected with a display device to transmit a second video signal to the display device; and a video transforming circuit connected between the video signal connector and the display connector to transform the first video signal in a first resolution to the second video signal in a second resolution and transmit the second video signal to the display connector.

2. The peripheral connecting device as claimed in claim 1, wherein the display device is a monitor.

3. The peripheral connecting device as claimed in claim 1, wherein the input device is a keyboard.

4. The peripheral connecting device as claimed in claim 1, wherein the input device is a mouse.

5. The peripheral connecting device as claimed in claim 1 further comprising:

a network connector connected with a network to transmit a network signal between the network and the peripheral connecting device while the host connecting port further comprises a network signal connector for transmitting the network signal between the peripheral connecting device and the electronic device.

6. The peripheral connecting device as claimed in claim 5, wherein the network further comprises a host connected to the peripheral connecting device through the network.

7. The peripheral connecting device as claimed in claim 6, wherein the host performs the authentication of the electronic device.

8. An input device for a peripheral connection of an electronic device, comprising:

a host connecting port connected to the electronic device, the host connecting port comprising a video signal connector and an input signal connector, the video signal connector receiving a first video signal from the electronic device, and the input signal connector for transmitting an input signal to the electronic device;

a display connector connected with a display device to transmit a second video signal to the display device; and a video transforming circuit connected between the video signal connector and the display connector to transform the first video signal in a first resolution to the second video signal in a second resolution and transmit the second video signal to the display connectors, wherein the input device generating the input signal.

9. The input device as claimed in claim 8, wherein the display device is a monitor.

10. The input device as claimed in claim 8, wherein the input device is a keyboard.

11. A peripheral connecting device of an electronic device, comprising:

a host connecting port connected to the electronic device, the host connecting port comprising a network signal connector for transmitting a network signal between the peripheral connecting device and the electronic device, and an input signal connector for transmitting an input signal to the electronic device;

an input device connector connected with an input device to transmit the input signal from the input device to the input signal connector; and a network connector connected with a network to transmit the network signal between the network and the peripheral connecting device, wherein the network further comprises a host connected to the peripheral connecting device through the network, and the host performs the authentication of the electronic device.

12. The peripheral connecting device as claimed in claim 11, the host connecting port further comprising a video signal connector for receiving a first video signal from the electronic device, and the peripheral connecting device further comprising:

a display connector connected with a display device to transmit a second video signal to the display device, and a video transforming circuit connected between the video signal connector and the display connector to transform the first video signal to the second video signal and transmit the second video signal to the display connector.

13. A peripheral connecting device of an electronic device, comprising:

a host connecting port connected to the electronic device, the host connecting port comprising a video signal connector for receiving a first video signal from the electronic device, and an input signal connector for transmitting an input signal to the electronic device;

an input device connector connected with an input device to transmit the input signal from the input device to the input signal connector;

a display connector connected with a display device to transmit a second video signal to the display device;

a video transforming circuit connected between the video signal connector and the display connector to transform the first video signal to the second video signal and transmit the second video signal to the display connector; and a network connector connected with a network to transmit a network signal between the network and the peripheral connecting device while the host connecting port further comprises a network signal connector for transmitting the network signal between the peripheral connecting device and the electronic device, wherein the network further comprises a host connected to the peripheral connecting device through the network, and the host performs the authentication of the electronic device.

14. An input device for a peripheral connection of an electronic device, comprising:

a host connecting port connected to the electronic device, the host connecting port comprising a video signal connector and an input signal connector, the video signal connector receiving a first video signal from the electronic device, and the input signal connector for transmitting an input signal to the electronic device;

a display connector connected with a display device to transmit a second video signal to the display device;

a video transforming circuit connected between the video signal connector and the display connector to transform the first video signal to the second video signal and transmit the second video signal to the display connector; and a network connector connected with a network to transmit a network signal between the network and input device while the host connecting port further comprising a network signal connector for transmitting the network signal between the input device and the portable electronic device, wherein the network further comprises a host connected to input device through the network, and the host performs the authentication of the portable electronic device.

* * * * *